Patented July 11, 1950

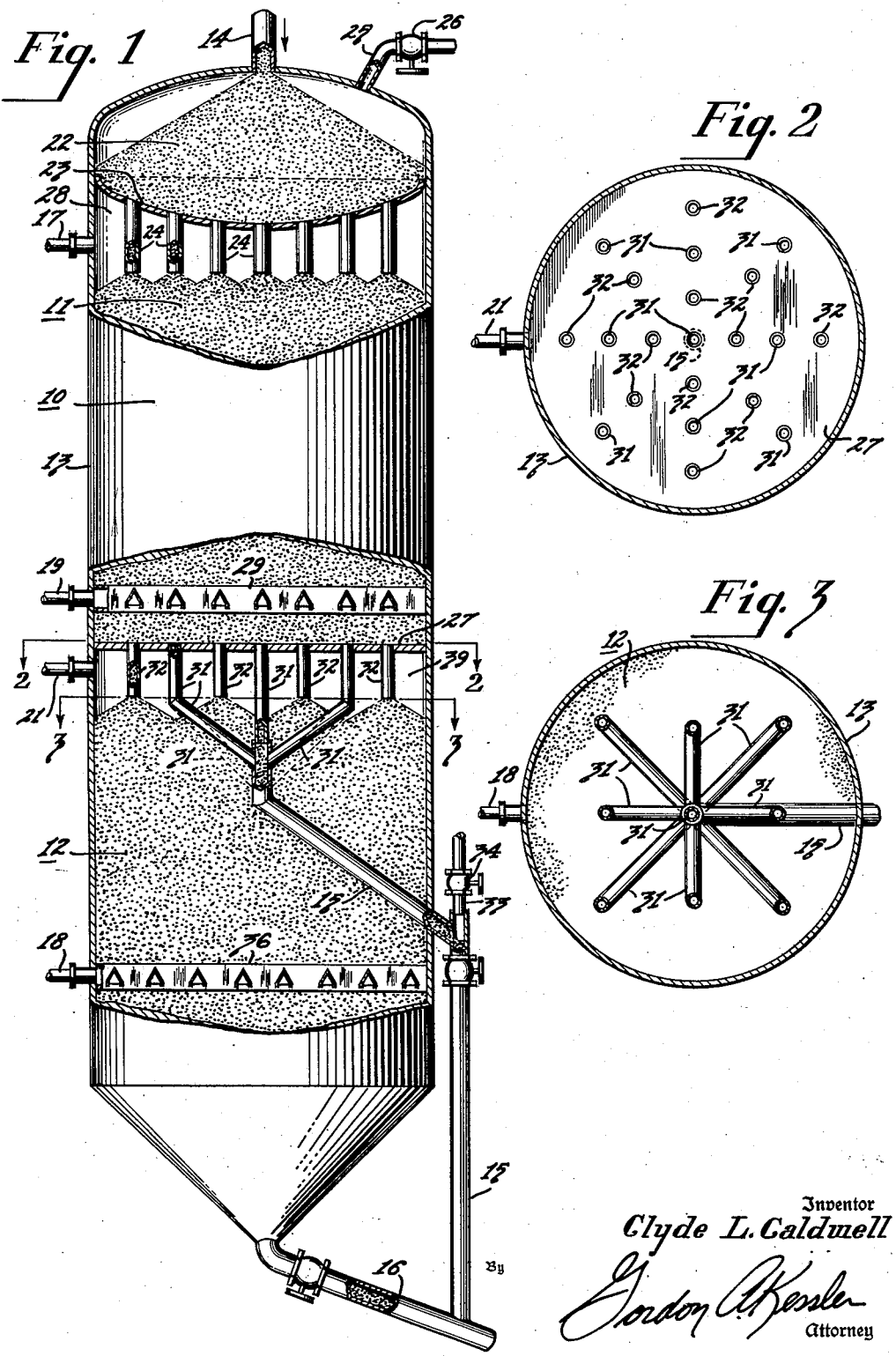

2,514,371

UNITED STATES PATENT OFFICE 2,514,371

PROCESSES EMPLOYING FLUENT SOLIDS

Clyde L. Caldwell, Long Beach, Calif., assignor to Houdry Process Corporation, Wilmington, Del., a corporation of Delaware Application December 30, 1947, Serial No. 794,679

13 Claims. (Cl. 196—52)

This invention relates to improvements in methods and apparatus employed in the continuous conversion of hydrocarbons wherein hydrocarbons contact particulate fluent solid hydrocarbon conversions catalysts.

When hydrocarbons contact a catalyst under conversion conditions including elevated temperatures, such as above 600° F. to about 1100° F., so as to form conversion products containing hydrocarbons different in molecular weight or structure or both, hydrocarbonaceous material, commonly referred to as coke, is concomitantly deposited on the catalyst and causes a reduction in catalytic activity. The catalyst is therefore periodically regenerated, as by contact with a free oxygen containing gas under combustion conditions, to effect removal of the deposit of coke and thus maintain catalytic activity. Such a hydrocarbon conversion process may be performed as a continuous operation by the use of a technique in which fluent solid hydrocarbon conversion catalyst is circulated in a system comprising a conversion zone and a regeneration zone.

In one method of moving the catalyst through such a system, the solid catalyst is in particulate or granular form, such as spheres or beads, sized particles, cast or extruded pellets or the like, and is sized so that the bulk of the catalyst will pass a three mesh screen and be retained by an eight mesh screen. Catalyst of such a size is fluent or capable of flowing and may conveniently be passed through a process zone for contact with process fluids as a downwardly moving non-turbulent bed. (i. e., the process fluids, even when in countercurrent flow relationship, do not cause turbulence or ebullience of the solid and hence the bed is in compact, unmixed form). It has been the common practice to pass the hydrocarbons through a single bed of catalyst and to vary conversion conditions, such as temperature, pressure, space velocity (the volume of hydrocarbon material charged to a conversion zone per hour, divided by the volume of catalyst instantaneously present in the reactor) and catalyst to oil weight ratio (the ratio of the rates of introduction of catalyst and oil to the conversion zone, expressed in terms of weight), for the entire body of catalyst.

I provide additional flexibility in hydrocarbon conversions of the type described herein by employing processes which involve simultaneously contacting two hydrocarbon fractions of different composition with two bodies or beds of fluent hydrocarbon conversion catalyst, catalyst being introduced to the first bed in a freshly regenerated condition and a fraction of the coked catalyst removed from the first bed being introduced to the second bed in the manner described herein. A mixture of the catalyst removed from the second bed and the remainder of catalyst removed from the first bed which was not forwarded to the second bed are thereafter regenerated and used again.

In a preferred embodiment of my invention, I employ the first bed or body of catalyst vertically superimposed above the second bed or body of catalyst and discharge the catalyst from the bottom of the first bed vertically downward and directly introduce only a fraction of such discharged catalyst to the top of the second bed in an unpurged condition, the remainder of the discharged catalyst being purged and forwarded to a rengeration zone. The transfer of catalyst between the two beds is accordingly effected with a minimum expenditure of energy and in a short time, and a considerable loss of heat to the surroundings is prevented.

The present invention and various embodiments thereof, together with their application and advantages, are described below in connection with the drawings in which, presented in a schematic manner;

Fig. 1 is an elevation with parts broken away and in section of a vessel containing two beds or bodies of catalyst, the vessel being provided with elements for the introduction and withdrawal of catalyst and hydrocarbon charge stocks;

Fig. 2 is a horizontal section of the vessel of Fig. 1 taken along the line 2—2;

Fig. 3 is a horizontal section of Fig. 1 taken along the line 3—3.

In accordance with the preferred embodiment of my invention exemplified in Fig. 1, I provide a vessel or housing indicated generally at 10, which vessel contains two beds or bodies of catalyst indicated generally at 11 and 12, bed 11 being vertically superimposed above bed 12. The beds of catalyst are confined laterally by wall 13 which may be a vertically elongated cylinder of substantially equal cross sectional area, thus giving beds of substantially equal cross sectional area. Vessel 10 is provided with a conduit 14 for the introduction of catalyst and conduits 15 and 16 for the removal of catalyst as well as with conduits 17 and 18 for the introduction of two hydrocarbon fractions or charge stocks of different composition and conduits 19 and 21 for the separate and independent removal of these charge stocks after passage through beds of catalyst 11 and 12, respectively.

In operation, freshly regenerated catalyst, from a regenerator or kiln (not shown) is introduced to vessel 10 by means of conduit 14 and flows into a storage chamber 22 where it rests on plate or tube sheet 23, plate 23 also serving as the upper boundary of the conversion zone. The catalyst flows out of storage chamber 22 by means of a plurality of conduits or open tubes 24 which insure even distribution of the catalyst over the entire horizontal cross sectional area of bed 11 and also provide resistance to flow of vapors from the conversion zone into the storage chamber 22. Prevention of such flow may be aided by introducing a sealing gas such as steam, spent flue gas, nitrogen and similar unreactive or inert gases through conduit 25 into chamber 22 at a pressure at least sufficient to balance the pressure exerted by the vapors in the conversion zone, the pressure being controlled by valve 26.

The catalyst introduced by conduits 24 flows downwardly by gravity as a continuous downwardly moving non-turbulent bed which bed extends from plate or tube sheet 27 to the bottom of conduits 24. Hydrocarbon vapors heated to a suitable temperature may be introduced through conduit 17 to the open space around conduits 24, which open space serves as a vapor distributing chamber 28 or as a vapor disengaging chamber when the hydrocarbon fraction is in countercurrent flow relation with the catalyst. The hydrocarbon vapors pass downwardly in concurrent flow relationship with the catalyst to essentially the bottom of bed 11 and are removed by a vapor collecting element 29 and conduit 19. Vapor collecting element 29 is a device of a type known to the art and described in the article referred to below. The catalyst, which has accumulated a deposit of coke during its contact with the hydrocarbon vapors, is discharged from the bottom of bed 11 as a plurality of parallel downwardly directed compact columns by means of two sets of conduits or open tubes 31 and 32. As shown in Fig. 1, some of these conduits (set 32) supply catalyst to the top of bed 12 in the lower part of the conversion zone while the catalyst in the conduits comprising set 31 is discharged into manifold 15 and is withdrawn from the conversion zone as a compact column. Alternatively, conduits 31 may separately extend to beyond housing 13 and be manifolded thereafter. Because a fraction of the total catalyst, such as between 50 and 90 and preferably between 70 and 85 percent, is withdrawn from the conversion zone, the rate of circulation of catalyst through bed 11 is greater than it is through bed 12.

In order to prevent hydrocarbon vapors in the conversion zone from escaping through manifold 15, I provide means for introducing a sealing gas, which may be a gas such as that introduced by conduit 25, to the compact column of withdrawn catalyst in manifold 15 at a point beyond the conversion zone as by conduit 33. This sealing gas may be introduced at a pressure higher than the pressure in the conversion zone at the point of withdrawal of the catalyst (i. e. where the catalyst enters conduits 31) this pressure being controlled by valve 34. The pressure of the sealing gas may be just sufficient to balance the pressure in the conversion zone or it may be slightly greater so a relatively small amount of sealing gas flows into the conversion zone, thus aiding in the disengagement of hydrocarbon vapors and purging or stripping the catalyst in manifold 15 of the volatile hydrocarbons adsorbed on the catalyst.

The catalyst in the conduits comprising set 32 moves downwardly through these conduits as parallel compact columns and discharges evenly over the top of bed 12, as shown in Fig. 2. A hydrocarbon fraction introduced by conduit 18 and device 36 (which is similar to or identical with device 29) passes upwardly through the downwardly moving non-turbulent bed. The products of the conversion together with the unconverted portion of the hydrocarbon fraction are disengaged from the open surface at the top of bed 12 and are removed through conduit 21.

Conduits 31 and 32 are spaced apart so as to form an open space 39 bounded by wall 13, plate 27 and the top of the catalyst bed. This open space is utilized as a vapor disengaging chamber, and, at the same time, spaces the two beds apart so that conduits 32 have a sufficient height so that any flow of vapors between the beds is retarded, thereby maintaining a pressure seal between the two beds since vapor communication can only occur through the compact columns of catalyst in conduits 32.

In one embodiment of my invention, the hydrocarbon fraction introduced to bed 12 is at a temperature substantially below the temperature at which the catalyst is introduced to the top of bed 12. For the catalysts presently in use, when the catalyst to oil ratio is low, such as less than 3.0 to 3.5, the heat capacity of the stream of hydrocarbon charge stock passing through the bed per unit time is considerably greater than the heat capacity of the stream of catalyst passing through the bed per unit time and the temperature of the hydrocarbon charge stock will tend to control the average temperature of the bed particularly when the hydrocarbon charge stock is in counter-current flow relationship to the catalyst. Under such conditions the average temperature of the lower bed may be held considerably below that of the upper bed without intermediate cooling of the catalyst, the heat in the catalyst being carried out of the bed by the effluent stream of products and unconverted reactants.

In the operation described immediately above, since only a fraction, such as between 10 and 50 percent and preferably between 15 and 30 percent, of the total catalyst from the upper bed is introduced to the top of the lower bed, a high catalyst to oil ratio can be maintained in the upper bed while maintaining a low catalyst to oil ratio in the lower portion of the bed without sacrificing charging capacity of the upper bed. In a typical operation, a siliceous cracking catalyst, such as a silica-alumina catalyst, having a specific heat in the range of 0.2 to 0.35 British thermal unit per pound degrees F., a low catalyst to oil ratio, such as preferably between about 0.05 to less than 0.5, and a charge stock introduced at a temperature substantially at, or only slightly higher than, the temperature at which the bed is intended to operate, may be used to produce the effect described.

Catalyst which has traveled through the vertical extent of bed 12 may be purged and withdrawn from vessel 10 by means of catalyst purging and withdrawal devices known to the art (not shown) and thereafter conveyed by conduit 16 together with catalyst withdrawn by manifold 15 to a regenerator or kiln (not shown) which may be of a type known to the art preferably such as described in the article "The 'T. C. C.' Cracking Process For Motor Gasoline Production" by R. H. Newton, G. S. Dunham, and T. P.

Simpson, "Transactions of The American Institute of Chemical Engineers," volume 41, page 215, April 25, 1945, and the articles there cited. In such a regenerator, the coked catalyst is contacted with oxygen or an oxygen containing gas for the removal of coke with concomitant increase in the temperature and heat content of the catalyst, after which the catalyst may be returned to vessel 10 through conduit 14.

The method described above lends itself to considerable flexibility of operation. Thus the operation effected in the upper zone may be a cracking reaction in which a hydrocarbon fraction higher boiling than gasoline is cracked to form substantial amounts of high octane gasoline, as for example where a light or heavy gas oil is cracked to yield over 35 percent of high octane gasoline per pass. In this event the catalyst is preferably an active cracking catalyst of a type known to the art, for example a natural or synthetic silica-alumina catalyst such as those described in U. S. Patent 2,078,945 issued to E. J. Houdry on May 4, 1937, or U. S. Patent 2,429,981 issued to J. R. Bates on November 4, 1947, respectively. Inasmuch as the catalyst and its method of manufacture are not a portion of this invention, further details will not be given, it being understood, however, that a cracking catalyst having at least a moderately high cracking activity should be used.

The conditions of operation under which the cracking operation is effected are well understood in the art and lie generally in the ranges of 750° to 1050° F., space velocities of 0.5 to 5, pressures from about atmospheric at 25 pounds per sq. inch catalyst to oil ratios from about 1 to 6 or even as high as 10. In an embodiment of the invention, these cracking conditions are correlated so that the amount of coke deposited on the catalyst in its passage through bed 11 is of the order of 8 to 10 grams of carbon per liter of catalyst, thus insuring that the catalyst fed to bed 12 still has sufficient cracking activity to effect the operations described herein. The limitation of the amount of coke deposited on the catalyst in the first bed is particularly advantageous in that the mixture of catalyst withdrawn from bed 11 and thereafter directly forwarded to the regenerator together with the catalyst withdrawn from the bottom of bed 12 has an average amount of coke which can be conveniently handled by regenerators or kilns now commonly used as, for example where the average amount of coke in the mixture on the two types of catalyst referred to is of the order of 12 to 18 grams of carbon per liter of catalyst.

In accordance with an important preferred embodiment of the invention, I effect a cracking operation in conjunction with a desulfurization operation. I contact freshly regenerated solid cracking catalyst with a hydrocarbon fraction higher boiling than gasoline under cracking conditions so as to crack said hydrocarbon fraction to substantial amounts of gasoline, such as an operation described in the preceding paragraph in connection with bed 11, and concomitantly deposit coke on the catalyst, separate the catalyst so coked from the cracked hydrocarbon vapors, and then contact under desulfurization conditions, such as described below, an unpurged fraction of the coked catalyst so separated with a normally liquid virgin hydrocarbon fraction having an end boiling point below 750° F. and containing undesirable amounts of sulfur. As described above, I then regenerate a mixture of catalyst used only for cracking and catalyst used for both cracking and desulfurization and return freshly regenerated catalyst to be used for further cracking. The hydrocarbon fraction desulfurized may consist of any or all straight run or virgin fractions boiling below 750° F. such as gasoline, kerosene, Diesel fuel and other fuel oils obtained by a simple distillation of crude oil. The desulfurization operation may be applied to a straight run gasoline or Diesel fuel from a high sulfur crude (high sulfur crudes generally but not always falling in the category of crudes having more than 1.0 percent by weight of sulfur in the fraction boiling between 400° to 1000° F.) or to a straight run gasoline having moderate amounts of sulfur, such as about 0.02 to .09 percent by weight, to increase the lead susceptibility or octane number or both of such gasoline.

Desulfurization conditions include average bed temperatures in the range of 700° to 900° F., space velocities from 0.5 to 5, and pressures in the range of atmospheric to slightly above atmospheric, such as 25 pounds per square inch; the combination of operating conditions selected from these ranges should be chosen so as to effect only mild conversion as judged by the amount of conversion of a Diesel fuel (having a boiling range of about 400° to about 750° F.), where between 10 and 30 percent is a mild conversion. A particularly effective desulfurization operation results, when unusually low catalyst to oil weight ratios in the range of 0.05 to less than 0.5 are used, such catalyst to oil ratios being particularly advantageous when used in conjunction with countercurrent flow of catalyst through bed 12. Thus the effect of an operating condition which tends to produce more severe conversion (such as a high temperature, high pressure, low space velocity, or relatively high catalyst to oil ratios) should be balanced or compensated for by the selection of at least one other operating condition in the opposite sense.

It is preferred to select operating conditions such that the production of coke, when a Diesel fuel cut is charged, is in the range of 0.5 to 2 percent of the hydrocarbon fraction charged with a production of gases lighter than butane of about 0.8 to 3.5 percent by a weight of the hydrocarbon fraction charged. Such operating conditions produce, when gasoline alone is treated, coke amounting to about 0.2 to 1 weight percent of the hydrocarbon fraction charged, with the concomitant production of gases lighter than butane of about the same amount or slightly lower than is produced when a Diesel fuel cut is charged. Moreover, conditions are preferably chosen so that the coke produced by the desulfurization reaction is about 25 percent or less of the total amount of coke produced by the cracking reaction.

It is to be understood that the aspect of the invention involving the method of flowing materials (catalyst and hydrocarbon fractions) through the system may be applied to various hydrocarbon conversion processes such as reforming, hydrogenation, dehydrogenation, aromatization and the like. The method described has numerous advantages among which are; the substantially immediate contact of the catalyst from the first bed with the hydrocarbon fraction contacted in the second zone, thus minimizing the change of the coke deposit, by soaking, to a heavy, condensed deposit which is difficult to remove; the low heat losses due to the manner of conveying the catalyst from one bed to the other; the efficient use of a single reactor vessel;

the integrated arrangement of the various necessary structural elements within the reactor while still maintaining the two hydrocarbon fractions separate; and the economy of motion in having a single direction of flow from the top of the first bed to the bottom of the second bed.

Additional advantages accrue by using modifications of the present invention. When both the beds are of substantially equal horizontal cross sectional area, not only is the rate of circulation greater in the upper bed but also the mass velocity of the catalyst in the upper bed is greater than it is in the lower bed. (Mass velocity may be defined as pounds of catalyst passing through a square foot of bed cross sectional area per hour.) By varying the relation between the amount of catalyst withdrawn from the conversion zone and the amount directed to the lower bed, the relation between the mass velocities in the two beds can be changed; a factor which lends considerable flexibility to the process.

Obviously many modifications and variations of the invention as hereinbefore set forth may be made without departing from the spirit and scope thereof and therefore only such limitations should be imposed as are indicated in the appended claims.

I claim as my invention:

1. In processes wherein fluent solid hydrocarbon conversion catalyst circulates in a system comprising a conversion zone and a regeneration zone, in which conversion zone hydrocarbons contact said catalyst under conversion conditions to form conversion products and concomitantly deposit coke on said catalyst, in which regeneration zone an oxygen containing gas contacts catalyst from the conversion zone under combustion conditions so as to remove coke deposited thereon, the improvement which comprises passing said fluent solid hydrocarbon conversion catalyst through the upper part of the conversion zone as a downwardly moving non-turbulent bed, removing said catalyst from the bottom of said bed as a plurality of parallel downwardly directed compact columns of catalyst, supplying catalyst from at least one of said columns to the top of a downwardly moving non-turbulent bed of catalyst in the lower part of said conversion zone, withdrawing the catalyst in at least one of said columns from the conversion zone, and simultaneously passing a first hydrocarbon fraction through the bed in the upper part of the conversion zone under conversion conditions and a second hydrocarbon fraction through the bed in the lower part of the conversion zone under conversion conditions, each of said fractions contacting its respective bed of catalyst substantially in the absence of the vaporous conversion products of the other fraction, whereby the rate of catalyst circulation through said upper part of the conversion zone is greater than the rate of catalyst circulation through said lower part.

2. The improvement of claim 1 further characterized in that the hydrocarbon conversion catalyst is a cracking catalyst, that a hydrocarbon fraction higher boiling than gasoline is passed through the catalyst bed in said upper part of the conversion zone under cracking conditions to form substantial amounts of high octane gasoline and that a normally liquid virgin hydrocarbon fraction having an end boiling point below 750° F. and containing an undesirable amount of sulfur is passed through the catalyst bed in said lower portion of the conversion zone under desulfurizing conditions.

3. The improvement of claim 1 further characterized in that said second hydrocarbon fraction is passed countercurrently through the bed of catalyst in the lower part of the conversion zone.

4. The improvement of claim 1 further characterized in that said second hydrocarbon fraction is introduced to the bottom of the bed of catalyst in the lower part of the conversion zone at a temperature substantially below the temperature at which the catalyst is introduced to the top of the same bed and the heat capacity of said second hydrocarbon fraction passed through said bed of catalyst in the lower part of the conversion zone per unit time is substantially greater than the heat capacity of the catalyst passing through said bed of catalyst in the lower part of the conversion zone per unit time, whereby the average temperature of the bed of catalyst in the lower part of the conversion zone is substantially lower than the average temperature of the bed of catalyst in the upper part of the conversion zone.

5. The improvement of claim 4 further characterized in that the hydrocarbon conversion catalyst is a siliceous cracking catalyst having a specific heat in the range of about 0.20 to about 0.35 British thermal unit per pound per degree Fahrenheit and a catalyst to hydrocarbon fraction weight ratio of between 0.05 to less than 0.5 is maintained in said lower part of the conversion zone.

6. The improvement of claim 5 further characterized in that the hydrocarbon fraction passed through the bed of catalyst in the lower part of the conversion zone is a normally liquid virgin hydrocarbon fraction having an end boiling point below 750° F. and contains an undesirable amount of sulfur, and in that desulfurizing conditions are maintained in the lower part of the conversion zone.

7. In processes wherein fluent solid hydrocarbon conversion catalyst circulates in a system comprising a conversion zone and a regeneration zone, in which conversion zone hydrocarbons contact said catalyst under conversion conditions to form conversion products and concomitantly deposit coke on said catalyst, in which regeneration zone an oxygen containing gas contacts catalyst from the conversion zone under combustion conditions so as to remove coke deposited thereon, the improvement which comprises passing said fluent solid hydrocarbon conversion catalyst through the upper part of the conversion zone as a downwardly moving non-turbulent bed, removing said catalyst from the bottom of said bed as a plurality of parallel compact downwardly directed columns of catalyst, supplying catalyst from at least one of said columns to the top of a downwardly moving non-turbulent bed of catalyst in the lower part of said conversion zone, withdrawing the catalyst in at least one of said columns from the conversion zone, and simultaneously passing a first hydrocarbon fraction through the bed in the upper part of the conversion zone under conversion conditions and a second hydrocarbon fraction through the bed in the lower part of the conversion zone under conversion conditions, each of said fractions contacting its respective bed of catalyst substantially in the absence of the vaporous conversion products of the other fraction, introducing to the catalyst so withdrawn at a point beyond the conversion zone an unreactive gas at a pressure greater than the gaseous pressure at the point of withdrawal of catalyst to prevent the escape of hydrocarbon vapors from the conversion zone whereby the rate of catalyst circulation through said upper part of the conversion zone is greater than the rate of catalyst circulation through said lower part.

8. The improvement of claim 7 further characterized in that the unreactive gas is introduced to the withdrawn catalyst at sufficient pressure above the gaseous pressure in the conversion zone so as to flow a relatively small amount of said unreactive gas into the conversion zone, thereby stripping said withdrawn catalyst of volatile hydrocarbons adsorbed thereon.

9. In a process wherein fluent solid hydrocarbon cracking catalyst circulates in a system in which hydrocarbons contact said catalyst under conversion conditions to form conversion products and concomitantly deposit coke on said catalyst, and catalyst on which coke has been deposited is regenerated by contacting it with an oxygen containing gas under combustion conditions so as to remove said coke, the improvement which comprises contacting freshly regenerated fluent solid hydrocarbon cracking catalyst with a hydrocarbon fraction higher boiling than gasoline under cracking conditions so as to crack said hydrocarbon fraction to substantial amounts of gasoline and concomitantly to deposit coke on said catalyst, separating catalyst so coked from cracked hydrocarbon vapors, contacting under desulfurization conditions a fraction of the coked catalyst so separated with a normally liquid virgin hydrocarbon fraction having an end boiling point below 750° F. and containing undesirable amounts of sulfur, and regenerating a mixture of catalyst used only for cracking and catalyst used for both cracking and desulfurization.

10. The improvement of claim 9 further characterized in that downwardly moving non-turbulent beds of said catalyst are contacted with both first and second named hydrocarbon fractions.

11. The improvement of claim 10 further characterized in that the downwardly moving non-turbulent bed of catalyst contacted by said hydrocarbon fraction boiling above gasoline is vertically superimposed above the downwardly moving non-turbulent bed of catalyst contacted by said normally liquid virgin hydrocarbon fraction and a fraction of the effluent catalyst from the upper bed is fed in an unpurged condition to the lower bed.

12. The improvement of claim 9 further characterized in that the coke deposited on the catalyst by contacting it with the hydrocarbon fraction higher boiling than gasoline is of the order of about 8 to 10 grams of coke per liter of catalyst.

13. In processes wherein fluent solid hydrocarbon conversion catalyst circulates in a system comprising a conversion zone and a regeneration zone, in which conversion zone hydrocarbons contact said catalyst under conversion conditions to form conversion products and concomitantly deposit coke on said catalyst, in which regeneration zone an oxygen containing gas contacts catalyst from the conversion zone under combustion conditions so as to remove coke deposited thereon, the improvement which comprises passing said fluent solid hydrocarbon conversion catalyst through the upper portion of the conversion zone as a downwardly moving non-turbulent bed, removing said catalyst from the bottom of said bed as a plurality of parallel compact downwardly directed columns of catalyst, supplying catalyst from at least one of said columns to the top of a downwardly moving non-turbulent bed of catalyst in the lower part of said conversion zone, withdrawing the catalyst in at least one of said columns from the conversion zone, said plurality of columns of catalyst passing through a confined vapor chamber between said upper and lower parts of the conversion zone as separated columns spaced apart from each other, said vapor chamber being in vapor communication with the top of the bed of catalyst in said lower part of the conversion zone and with a zone outside the conversion zone and in vapor communication with the upper part of the conversion zone only through the columns of catalyst discharging into said lower part of the conversion zone whereby a pressure seal is maintained between the upper and lower parts of the conversion zone, and simultaneously passing a first hydrocarbon fraction through the bed in the upper part of the conversion zone under conversion conditions and a second hydrocarbon fraction through the bed in the lower part of the conversion zone under conversion conditions, each of said fractions contacting its respective bed of catalyst substantially in the absence of the vaporous conversion products of the other fraction, whereby the two hydrocarbon fractions are contacted separately with catalyst at two different rates of catalyst circulation, the rate of catalyst circulation in said upper part of the conversion zone being greater than the rate of catalyst circulation through said lower part.

CLYDE L. CALDWELL.

REFERENCES CITED

The following references are of record in the file of this patent:

UNITED STATES PATENTS

| Number | Name | Date |
|---|---|---|
| 2,387,378 | Wolk | Oct. 23, 1945 |
| 2,393,909 | Johnson | Jan. 29, 1946 |
| 2,432,520 | Ferro, Jr. | Dec. 16, 1947 |